United States Patent
Fryda et al.

(10) Patent No.: US 11,008,231 B2
(45) Date of Patent: May 18, 2021

(54) APPARATUS FOR ELECTROCHEMICAL TREATMENT OF WASTEWATER

(71) Applicant: CONDIAS GmbH, Itzehoe (DE)

(72) Inventors: Matthias Fryda, Itzehoe (DE); Barbara Behrendt-Fryda, Itzehoe (DE); Thorsten Matthée, Hohenaspe (DE)

(73) Assignee: CONDIAS GMBH, Itzehoe (DE)

( * ) Notice: Subject to any disclaimer, the term of this patent is extended or adjusted under 35 U.S.C. 154(b) by 0 days.

(21) Appl. No.: 15/726,434

(22) Filed: Oct. 6, 2017

(65) Prior Publication Data

US 2018/0099881 A1    Apr. 12, 2018

(30) Foreign Application Priority Data

Oct. 7, 2016 (DE) .................... 10 2016 119 080.2

(51) Int. Cl.
| | |
|---|---|
| *C25B 1/04* | (2021.01) |
| *C02F 1/461* | (2006.01) |
| *C02F 1/467* | (2006.01) |
| *C02F 1/00* | (2006.01) |

(52) U.S. Cl.
CPC ........ *C02F 1/46109* (2013.01); *C02F 1/4672* (2013.01); *C02F 1/006* (2013.01); *C02F 2001/46147* (2013.01); *C02F 2001/46157* (2013.01); *C02F 2001/46161* (2013.01); *C02F 2201/4611* (2013.01); *C02F 2201/4614* (2013.01)

(58) Field of Classification Search
CPC .... C25B 1/04; C25B 9/00; C25B 9/06; C25B 9/18; C25B 15/00; C25B 9/12; Y02E 60/366
USPC ................................. 204/278.5, 280
See application file for complete search history.

(56) References Cited

U.S. PATENT DOCUMENTS

| | | | |
|---|---|---|---|
| 6,358,398 B1 * | 3/2002 | Halldorson | C02F 1/46114 205/754 |
| 2009/0301865 A1 * | 12/2009 | Yoshida | C02F 1/46109 204/242 |
| 2015/0034479 A1 * | 2/2015 | Pan | C25B 9/04 204/277 |
| 2015/0298998 A1 * | 10/2015 | Legzdins | C02F 1/46104 205/748 |

FOREIGN PATENT DOCUMENTS

| | | |
|---|---|---|
| DE | 26 44 787 A1 | 4/1978 |
| DE | 43 28 569 A1 | 5/1994 |
| DE | 299 16 126 A1 | 1/2000 |
| DE | 198 42 396 A1 | 4/2000 |
| DE | 198 48 184 A1 | 5/2000 |
| DE | 198 57 638 A1 | 6/2000 |

(Continued)

*Primary Examiner* — Zulmariam Mendez
(74) *Attorney, Agent, or Firm* — W&C IP (57) ABSTRACT

An apparatus for electrochemical treatment of wastewater has at least one electrolysis cell through which the wastewater to be treated is guided. The electrolysis cell has a multitude of electrode assemblies that have electrodes arranged such that the wastewater to be treated is guided through holes in the electrodes. At least one of the electrode assemblies has three electrodes arranged such that the wastewater to be treated is guided through all the electrodes.

13 Claims, 8 Drawing Sheets

(56) References Cited

FOREIGN PATENT DOCUMENTS

| | | |
|---|---|---|
| DE | 102 19 688 A1 | 11/2003 |
| DE | 101 11 727 B4 | 7/2006 |
| DE | 10 2007 028 074 A1 | 12/2008 |
| DE | 10 2008 047 148 A1 | 4/2010 |
| DE | 103 16 759 B4 | 4/2010 |
| DE | 10 2009 005 011 A1 | 7/2010 |
| DE | 10 2009 048 108 B3 | 5/2011 |
| DE | 10 2014 002 450 A1 | 8/2015 |
| DE | 10 2014 203 372 A1 | 8/2015 |
| DE | 10 2014 203 374 A1 | 8/2015 |
| DE | 10 2014 203 376 A1 | 8/2015 |
| DE | 10 2015 004 101 A1 | 9/2016 |
| EP | 0 659 691 A1 | 6/1995 |
| EP | 2 072 472 A1 | 6/2009 |
| EP | 2 072 641 A1 | 6/2009 |

* cited by examiner

APPARATUS FOR ELECTROCHEMICAL TREATMENT OF WASTEWATER

FIELD OF THE INVENTION

The invention relates to an apparatus for electrochemical treatment of wastewater, wherein the apparatus has at least one electrolysis cell through which the wastewater to be treated is guided, wherein the at least one electrolysis cell has a multitude of electrode assemblies comprising electrodes.

BACKGROUND

The electrochemical treatment of liquid, especially of wastewater, has long been known from the prior art. For example, DE 299 16 126 U1 describes an arrangement for anodic oxidation which can especially be used for water treatment and wastewater treatment in swimming baths. The apparatuses have electrode arrangements in the form of electrolysis cells through which the liquid is guided. An arrangement of this kind is also known, for example, from EP 0 659 691 A1 and DE 10 2014 002 450 A1.

DE 10 2007 028 074 A1 describes a process and an apparatus which can be used for treatment of radioactive wastewaters. Here too, the corresponding wastewater is guided through an electrolysis cell. DE 10 2009 005 011 A1 discloses a process and an apparatus for electrochemical disinfection of drinking water and service water having high hardness levels. In all these processes and apparatuses, the water or wastewater to be cleaned is guided through the electrolysis cell. The electrolysis cell has electrodes to which an electrical voltage is applied, such that an electrical current flows through the liquid which is to be cleaned. There may be formation here, for example, of disinfectants, for example ozone, which is used for the disinfection and cleaning of the wastewater. The advantage is that the ozone is generated directly in the wastewater and has only a short lifetime within the water. The cleaned water is thus ozone-free again and can be used without any concern.

Alternatively, a corresponding apparatus and especially a corresponding electrolysis cell can also be used in order to produce substances which otherwise can be prepared only with difficulty or not at all or hazardous substances in exactly the desired concentration. For example, DE 199 48 184 A1 discloses a process for electrochemical preparation of peroxodisulfuric acid, in which corresponding electrodes having a doped diamond layer are likewise used. By contrast, it is known from DE 10 2015 004 101, which was yet to be published at the priority date of the present application, to prepare dilute hydrofluoric acid by using an electrolysis cell having two diamond electrodes.

The preparation of ozone and other disinfectants by an electrochemical treatment of liquids, for example wastewater or water, can of course also be used to clean other things. Rather than the wastewater, in this case, for example, distilled water or deionized water is used, which is guided through the electrolysis cell preferably having diamond electrodes. This gives rise, for example, to ozone within the clean water, which can be used in this way for cleaning and oxidative treatment of surfaces. Corresponding processes and apparatuses are known, for example, from DE 102 19 688 A1 and DE 101 11 727 B4.

The cleaning of a gas stream is also possible in this way by guiding the gas stream, for example, through a reaction vessel filled with an aqueous electrolyte, with continuous introduction of hydroxyl radicals that are produced by means of a diamond electrode arrangement into the electrolyte. This is known, for example, from DE 103 16 759 B4. The electrochemical treatment of liquids is the subject of DE 10 2014 203 372 A1 and EP 2 072 472 A1, while DE 10 2014 203 376 is concerned explicitly with the production of ozonized water. In all the apparatuses, electrolysis cells having diamond electrodes are used. DE 10 2008 047 148 A1 discloses the cleaning and disinfection of a vessel, in which correspondingly ozonized water is used.

The diamond electrode itself can be produced in a wide variety of different ways. For example, DE 198 42 396 A1 and DE 10 2009 048 108 B3 each disclose a process for producing a corresponding diamond electrode. In the latter publication in particular, a base structure to which the diamond layer is applied is pretreated and provided with a rough, fissured surface in order to increase the diamond surface area. Such roughening of the surface to be coated is also known from EP 2 072 641 A1, wherein the surface is subsequently also treated with an etchant. DE 10 2014 203 374 A1 describes an electrode arrangement and a corresponding electrode having a specific form matched to the field of application.

Electrolysis cells having electrodes, especially having diamond electrodes, are consequently usable within a broad field of use. Conventionally, an electrolysis cell has two electrodes, one of which is used as the anode and the other cathode. Between the two, there is a membrane, for example, which can take the form of an ion exchange membrane as described in DE 10 2014 203 374 A1 and DE 10 2014 203 376 A1. Also known from the prior art is the use of a solid electrolyte between the two electrodes.

In this type of electrolysis cell, the liquid to be subjected to electrochemical treatment is guided between one of the two electrodes and the appropriate membrane. A disadvantage, however, because of the high field strengths required in the electrical field which is caused by the electrical voltage which is applied between the electrodes, is that the distance chosen between the two electrodes has to be very small in order to achieve the required field strengths. At the same time, it is necessary that the liquid to be treated is put in a flow of maximum turbulence in order to achieve good mixing of the substances produced by the electrolysis in the liquid. This additionally distinctly improves an efficiency of the electrode, since saturation effects that can occur in the immediate proximity of the electrode if the electrolysis products cannot be removed from the electrode are avoided. This removal of the electrolysis products is advantageously achieved via the turbulent flow, which ensures good mixing of the products in the liquid to be treated and hence overcomes the mass transfer limitation.

Especially in the case of electrochemical treatment of wastewaters, this mixing is highly advantageous. In the electrolysis cell, hydroxyl radicals are formed from the water present in the wastewater, and these degrade the trace materials present in the wastewater that are to be removed. The hydroxyl radicals preferably form here directly from an anodic electrolysis of water at the corresponding electrode. There is no need to use additional chemicals.

The hydroxyl radicals thus formed, because of their high oxidation potential, have a very short half-life within the wastewater since they find an oxidation partner almost immediately after they are formed. Consequently, the hydroxyl radicals are only present in the immediate proximity of the actual electrode surface, and for that reason the trace materials and impurities in the wastewater that are to be degraded have to be transported within this diffusion region. This too is achieved via the good mixing of the wastewater by the turbulent flow which is caused in the electrolysis cell.

However, a disadvantage is that, because of the high oxidation potential of the hydroxyl radicals, there can also be oxidation of other substances, for example halides present in a wastewater. This gives rise to electrolysis by-products that are undesirable and preferably have to be removed again before the cleaned wastewater can be used further.

SUMMARY

It is consequently an object of the present invention to further develop an apparatus of the generic type for electrochemical treatment of wastewater such that good mixing of the substances in the wastewater is achieved and, at the same time, the unwanted electrolysis by-products are very substantially removed from the cleaned wastewater.

The invention achieves the stated object by means of an apparatus for electrochemical treatment of wastewater which has the characteristic features that the electrodes in the multitude of electrode assemblies are arranged such that the wastewater to be treated is guided through the holes in the electrodes, and at least one of the electrode assemblies has three electrodes arranged such that the wastewater to be treated is guided through all the electrodes.

Unlike in the electrolysis cells from the prior art, the wastewater to be treated is consequently not guided between the electrode and a membrane or wall that bounds the corresponding electrode chamber, but instead flows through all the electrodes of the electrode assemblies. For this purpose, the electrodes have holes which may be present, for example, in the form of a pattern of holes in a regular or irregular arrangement. In this way, it is ensured that the wastewater to be treated is guided along at least one anode. The hydroxyl radicals already described, with their high oxidation potential, are formed here, and the good mixing achieves the effect that a maximum amount of the substances and trace materials to be removed from the wastewater are oxidized by the hydroxyl radicals thus formed and hence removed. If, however, there is simultaneous occurrence of the unwanted electrolysis by-products which likewise form through oxidation by the hydroxyl radicals and hence cannot be prevented, these oxidation by-products are removed again or destroyed at a downstream cathode, past which the wastewater that has already been subjected to anodic treatment is guided. In this way, it is ensured that the unwanted by-products are present in the treated wastewater in a very low concentration at most, but preferably are no longer present at all. The use of three electrodes allows the electrical potentials and fields present between the electrodes to be optimized within the respective electrode assembly, in order firstly to allow very substantially complete oxidation of the trace materials and substances to be removed by the hydroxyl radicals and secondly to ensure that the level of oxidation by-products that are inevitably formed is reduced to a maximum degree.

In a preferred configuration of the apparatus, all the electrode assemblies have three electrodes through which the wastewater to be treated is guided. In this way, the cleaning effect of the apparatus on the wastewater to be subjected to electrochemical treatment can be maximized and optimized. Advantageously, the electrode assemblies are arranged in a fixed manner relative to one another, and the same distance or a different distance may exist between adjacent electrode assemblies. In a preferred configuration, the distance between two adjacent electrode assemblies is adjustable. In a particularly preferred in the case of configurations of the electrolysis cell of simple construction, the individual electrode assemblies are fixed relative to one another by guide elements, for example bars or rails. It is possible here in a particularly simple manner to vary the number of electrode assemblies used and, for example, to insert additional assemblies into the guide elements. In this way, the electrolysis cell and the intensity of the cleaning and treatment effect can be matched to the situation required in each case, without any need for complicated retrofitting or extension. The individual electrode assemblies can be secured to one another by a clamping apparatus, for example a screw connection, as already described in DE 10 2014 002 450 A1. However, it should be noted that, by contrast with the configuration specified in this publication, the liquid to be treated is guided through all the electrodes.

Preferably, the electrodes have a multitude of holes and a distance from one hole to the next-but-one hole in each case is at least as great as the diameter of the holes. The holes are preferably arranged regularly in the form of a pattern, grid or lattice. In the case of a square pattern or square lattice, for example, every hole has four direct neighbors having the shortest distance to the respective hole. In addition, each hole has four next-but-one neighbors. In the case of a square pattern in which the holes are arranged at the corners of mutually adjacent squares, immediately adjacent holes lie alongside one another along an edge of a square, while the respective next-but-one neighbors lie alongside one another along a diagonal of a square. The holes may be circular, oval, polygonal or of irregular shape. Each electrode preferably has a multitude of holes arranged, for example, in a regular pattern, for example in a rectangular, hexagonal or triangular pattern. It will be appreciated that any other arrangement of the holes is also conceivable. Moreover, not all the holes of one electrode need have the same shape. Preferably, however, this is the case.

Preferably, the holes are arranged and dimensioned such that the holes of one electrode would be completely covered by interstices of an adjacent electrode if the two electrodes were to lie directly one on top of the other. In this case, it would consequently be impossible to allow a liquid to flow through the two electrodes. This first becomes possible by virtue of the two electrodes not being arranged one directly atop the other, but having a separation from one another.

In the case of holes that are not circular, the diameter of the holes means the extent of the hole in the direction toward the closest neighbor. The distance between two holes and the diameter of the holes are consequently determined in the same direction. For particular applications, however, it is advantageous when the distance between two holes is greater than the diameter of the respective hole. This depends on the geometry, the flow rate of the wastewater flowing through and the desired residence time of the wastewater within the electrolysis cell and within each electrode assembly.

Preferably, moreover, the diameter of a hole is greater than the thickness of the electrode.

Advantageously, the electrodes of at least one of the electrode assemblies, but preferably of all the electrode assemblies, are arranged offset from one another, such that the holes of the electrodes do not line up. This means that the wastewater that flows through the holes of one electrode is forced to change course in order to pass through the holes of the next electrode as well. In this way, the turbulence within the electrode assemblies is increased and hence the mixing is also improved. In addition, there are regions in which the flow rate is reduced compared to a mean flow rate of the wastewater. If it is possible to place these zones of relatively low flow rate very close to the electrode surface via skilful choice of the number, diameter, form and pattern of the arrangement, the effect of electrolysis in this region can be maximized.

Preferably, at least some edges of the holes, but preferably all the edges of the holes, have chamfers. In this way too, the flow characteristics of the wastewater flowing through the electrolysis cell can be affected and optionally optimized. The chamfer angle and the chamfer size can be chosen freely and can thus be adjusted to the desired properties in the treatment of the wastewater.

Advantageously, one portion of the electrode assemblies has two anodes and one cathode, while a second portion of the electrode assemblies has one anode and two cathodes. It has been found here to be advantageous when two adjacent electrode assemblies belong to different portions. This means that, for example, two anodes and one cathode are present in one electrode assembly, with the cathode in this case arranged between the two anodes. The downstream electrode assembly in flow direction, by contrast, has two cathodes and one anode, with the anode in this case arranged between the two cathodes. In this way, it is ensured that the wastewater, on its way through the electrolysis cell, is always guided alternately past an anode and a cathode. Alternatively, it is also possible to configure each electrode assembly in the same way and, for example, to provide two cathodes and one anode, again with the anode arranged between the cathodes. This ensures that the oxidation by-products to be removed by the cathode are reliably removed. It will be appreciated that it is also advantageous for applications to form all or at least many of the electrode assemblies with two anodes and one cathode, with the cathode arranged between the anodes.

Alternatively, it is also possible for each of the electrode assemblies used to have one anode between two cathodes. In this way, it is possible to minimize the electrolysis by-products that form at the anode.

It has been found to be advantageous when the wastewater to be treated is guided through at least one perforated plate arranged upstream of the electrode assemblies in flow direction of the wastewater to be treated. This perforated plate can but need not be an electrode. It serves as a "baffle" and ensures primarily that any wastewater introduced into the electrolysis cell in laminar flow is put in a turbulent flow. This increases the efficiency of the first electrode through which the wastewater flowing through flows.

The distance between individual electrodes within an electrode assembly is advantageously less than 1 mm, particularly advantageously 0.5 mm, while the distance between two adjacent electrode assemblies is advantageously more than 1 mm, for example 2 mm or 5 mm. The distance from the perforated plate arranged upstream of the first electrode assembly to the first electrode assembly is likewise advantageously 2 mm or 5 mm.

It will be appreciated that the apparatus for electrochemical treatment of wastewater has the possibility of supplying the individual electrodes with an electrical current density and in this way of generating an electrical field between the individual electrodes. For this purpose, the apparatus advantageously has an electrical control system, by means of which, for example, through an electronic data processing unit, the current densities or electrical potentials to be established in each case can be set and controlled accurately. The open- or closed-loop control parameters used may, for example, be the residual content of the soiling materials which is actually to be removed within the wastewater, measured at the outlet from the electrolysis cell. It has been found to be advantageous when the electrical control system is set up to supply the anodes and/or the cathodes of different electrode assemblies, but preferably also of a single electrode assembly, with differently electrical current densities. It is thus possible to put the anodes present in different electrode assemblies at different electrical potentials which differ, for example, from electrode assembly to electrode assembly. It has been found to be particularly advantageous, however, when even different anodes of a single electrode assembly can be set at different electrical potentials. In the context of the present invention, this means that the anodes are supplied with different current densities. This is of course analogously likewise true of the cathodes present in the electrolysis cell.

In a preferred configuration, the electrodes have different hole patterns. Advantageously, for example, there is an increase in the size of the holes in flow direction of the wastewater to be treated. Here too, it is possible, however, to achieve the desired flow characteristics, or at least affect the flow characteristics of the wastewater that has flowed in, via skilful selection of the size, the geometric contour or the arrangement of the holes or via the number thereof.

Preferably, at least some of the electrodes, but preferably all the electrodes, possess a diamond-coated base structure composed of a passivating metal have. The diamond coating on the base structure may be doped, for example boron-doped. The use of corresponding diamond electrodes has long been known from the prior art.

By means of an apparatus according to the working examples of the present invention, it has become possible to remove a distinctly greater proportion of the organic impurities present in a wastewater without needing to operate a distinctly more complex apparatus for the purpose, since, especially preferably, the wastewater to be treated is guided both through anodes and through cathodes. The limiting electrical current available for the oxidation of the impurities to be moved can be distinctly increased in this way. Any electrical current available beyond this limiting electrical current that flows between the respective electrodes of the electrolysis cell is still used to produce oxidation by-products, which cannot be prevented owing to the high oxidation potentials of the hydroxyl radicals, but these are rendered harmless again at the cathodes present in the electrolysis cell.

DESCRIPTION OF THE DRAWINGS

With the aid of the appended drawings, a working example of the present invention is elucidated in detail hereinafter. The figures show.

DETAILED DESCRIPTION

Figure 1:
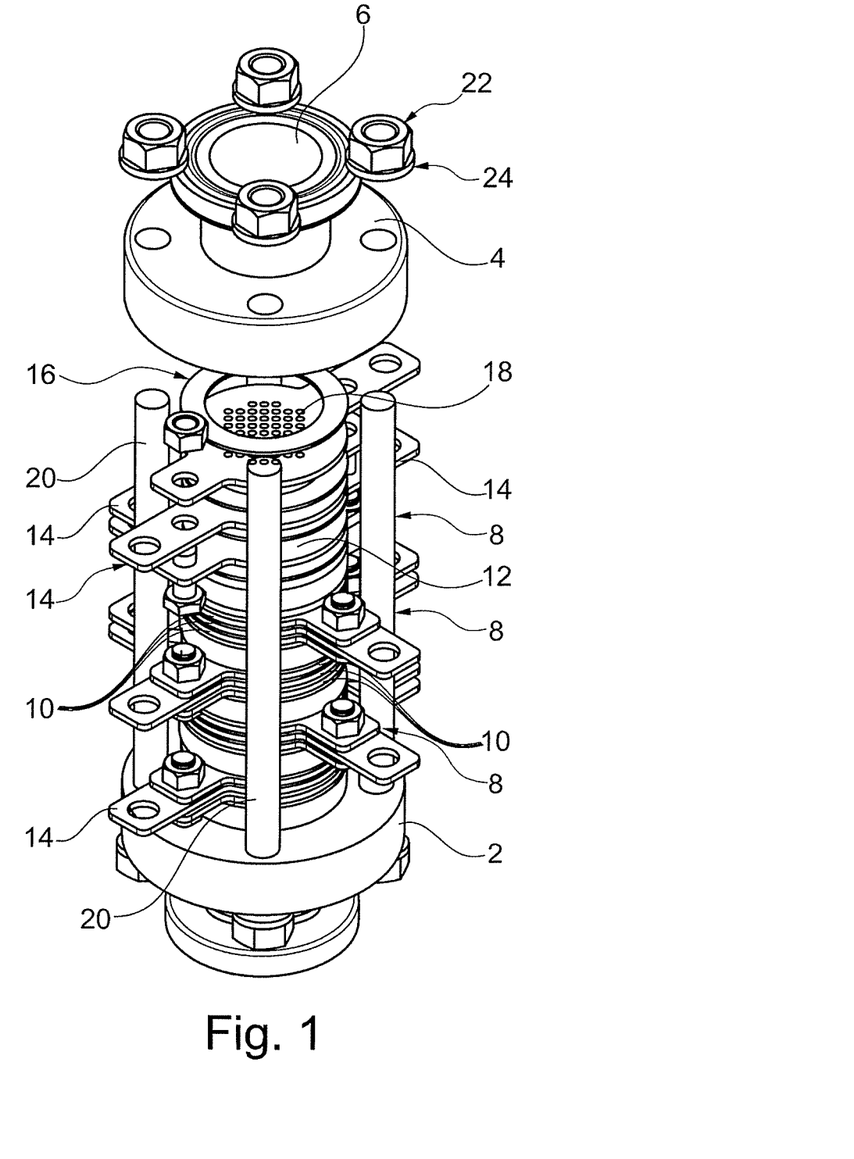
FIG. 1—the schematic three-dimensional view of a partly assembled apparatus in a first working example of the present invention, FIG. 2—a side view of such an apparatus, FIG. 3—the top view of such an apparatus and FIGS. 4 to 8—different geometries of electrodes for such an apparatus.

FIG. 1 shows an apparatus 1 in a first working example of the present invention. In the working example shown, it has a base flange 2 and a top flange 4 that bound the apparatus on two sides and have a flow orifice 6 through which the wastewater, for example, can be guided through the apparatus 1. Between the base flange 2 and the top flange 4 there are multiple electrode assemblies 8, each of which has three electrodes 10.

Arranged between the individual electrode assemblies 8 are gaskets 12 that space apart every two adjacent electrode assemblies 8 and prevent flow of the wastewater in any other direction than from base flange 2 to top flange 4 or vice versa.

The electrodes 10 have a contact connection site 14, by means of which the respective electrode can be connected to an electrical voltage or power source. In each electrode assembly 8, the uppermost and lowermost electrodes 10 have the same sign for the voltage or the electrical potential, while the middle electrode 10 has the reverse sign. These are consequently two cathodes surrounding an anode or vice versa.

Arranged between the individual electrodes are gasket rings 16 that space apart the different electrodes 10 within an electrode assembly 8 and prevent outflow of wastewater at this site.

It is apparent that the electrode 10 has a multitude of holes 18 through which the wastewater can flow.

The apparatus 1 shown in FIG. 1 is fixed and held together by means of threaded bars 20. Screw nuts 22 and washers 24 may be arranged at the ends of the threaded bars 20, and these ensure that the apparatus 1 remains in the assembled state.

Figure 2:
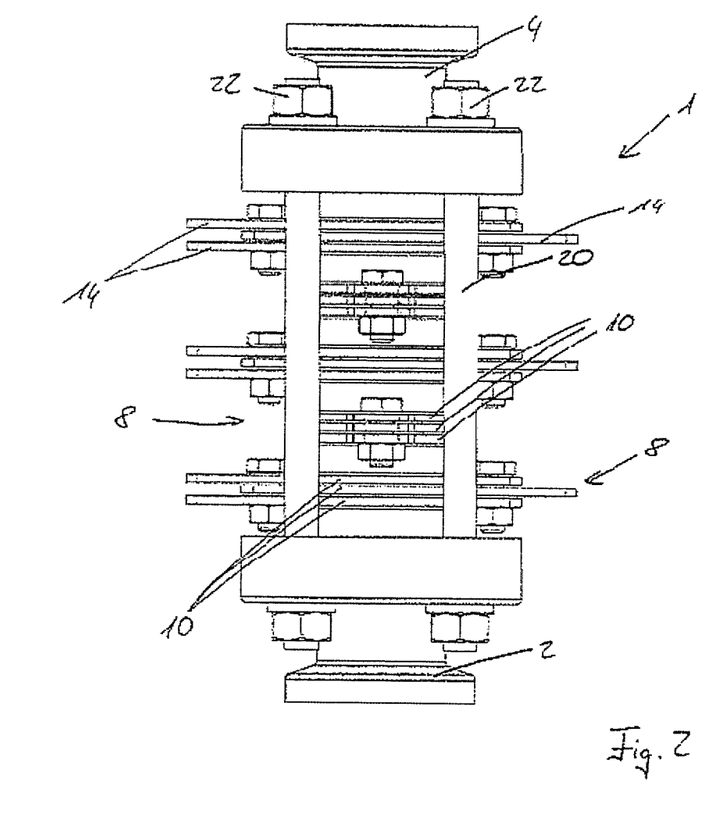

FIG. 2 shows a side view of the apparatus 1. The three electrodes 10 of each electrode assembly 8 are apparent. The electrode assemblies 8 are spaced apart from one another and are compressed together by the base flange 2 and by the top flange 4, which are kept in position by means of the threaded bars 20 and the screw nuts 22. This gives rise to a firm connection which reliably prevents outflow of wastewater in any other direction than that desired.

It is apparent that the contact connection sites 14 of the uppermost and lowermost electrodes 10 of each electrode assembly 8 lead to the same side, while the contact connection site 14 of the middle electrode 10 projects from the apparatus 1 to the opposite side. This enables particularly simple contact connection. The contact connection sites 14 of adjacent electrode assemblies 8 are additionally offset from one another by 90°.

Figure 3:
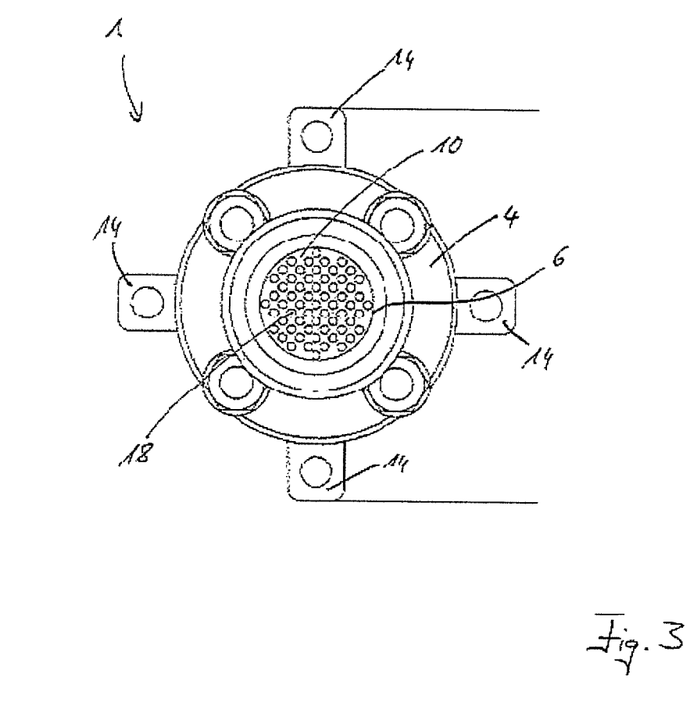

This is clearly apparent in FIG. 3 in particular, which shows a top view of the apparatus 1. The top flange 4 has the flow orifice 6, through which the holes 18 of the electrode 10 are visible. The contact connection sites 14 project beyond the circumference of the top flange 4 on four sides. Contact connection sites 14 opposite one another in each case can be assigned to the same electrode assembly 8.

Figure 4:
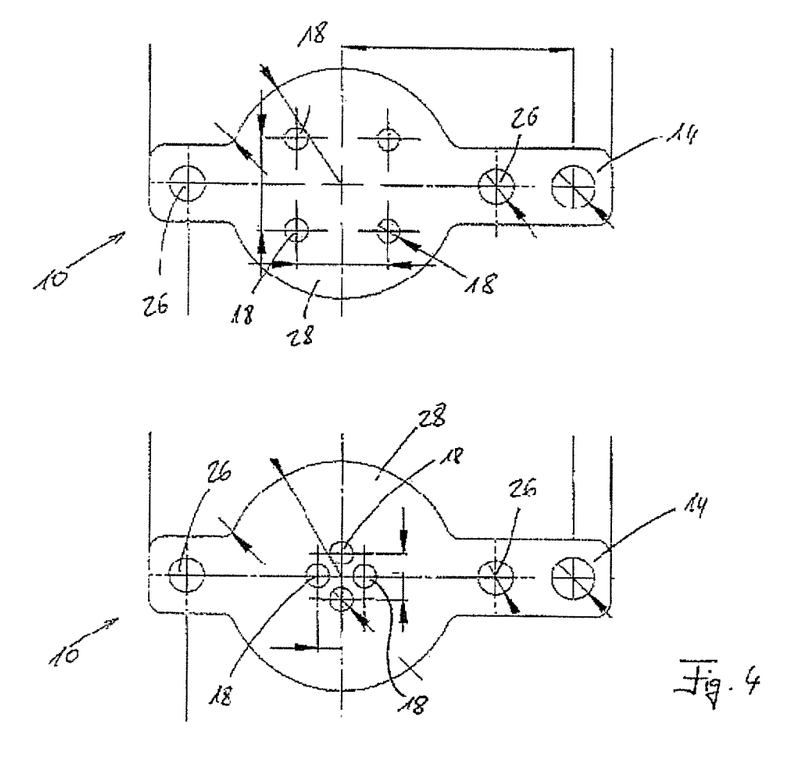

FIG. 4 shows two configurations of a corresponding electrode 10. They have the contact connection site 14 and two securing holes 26, by means of which the electrodes 10 can be secured. In a main region 28 there are four holes 18 in each case, which are arranged in the form of a quadrangle. The two electrodes 10 shown in FIG. 4 may be used, for example, as anode and cathode of an electrode assembly 8. If the two electrodes 10 are imagined as being placed one on top of the other, the holes 18 of one electrode 10 are completely covered by the main region 28 of the respective other electrode 10. Direct flow along a straight line at right angles to the drawing plane of FIG. 4 is thus not possible. Since, however, as shown in FIG. 1, a gasket ring 16 is arranged between every two electrodes 10, the two electrodes 10 in an electrode assembly 8 do not lie directly one on top of the other, and so the wastewater finds a way through the electrodes 10.

The holes 18 in the upper portion of FIG. 4 form a quadrangle on an edge, while the holes 18 shown in the lower diagram of FIG. 4 form a quadrangle on its tip. The closest neighbors of any hole 18 here in each case are the holes 18 that have been shifted along one edge of the quadrangle, while the holes 18 adjacent along the diagonal of the quadrangle are the next-but-one neighbors in the context of the present application. It is apparent that, in both embodiments, a distance between two holes 18 that are the next-but-one neighbors to one another is greater than the diameter of each of the holes 18. This configuration and the particular arrangement of the holes achieve the effect that the wastewater is put in a particularly turbulent flow when it passes through the electrodes 10.

FIG. 5 shows two further embodiments of an electrode 10. Both have a multitude of holes 18 arranged around a circle in each case. However, the two circles in the case of the electrodes 10 shown in FIG. 5 have distinctly different diameters, and so the holes 18 of an electrode 10 here too would be covered by the main region 28 of the respective other electrode 10 if the two electrodes 10 were to be placed directly on top of the other. If these electrodes 10 are used as anode and cathode in an electrode assembly 8, such that a distance between the electrodes 10 is maintained, here too there is consequently turbulent flow of the wastewater which is guided through these two electrodes 10. Through skilful choice of the size of the holes, it is possible either in the electrodes 10 shown in FIG. 4 or in the electrodes 10 shown in FIG. 5 that the entire passage area, i.e. the area content of all the holes 18, is identical.

Figure 6:
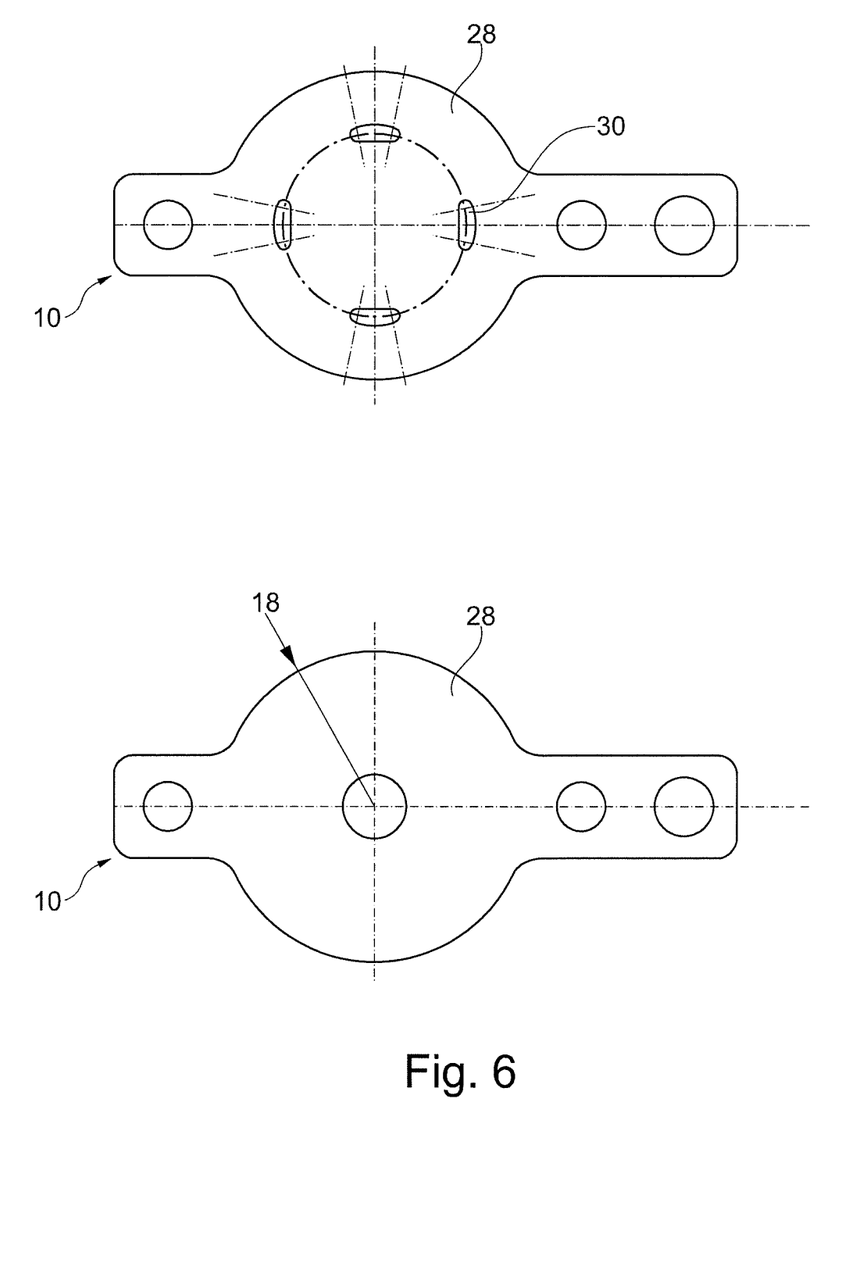

The same applies to the electrodes 10 shown in FIG. 6. The upper electrode 10 has four elongated holes 30 arranged around the circumference of a circle. By contrast, the lower electrode shown in FIG. 6 has just one single central hole 18, but one that would be completely covered if the two electrodes shown in FIG. 6 were to be placed on top of the other. The same applies to the elongated holes 30, which are likewise completely covered by the main region 28 of the respective other electrode.

Figure 7:
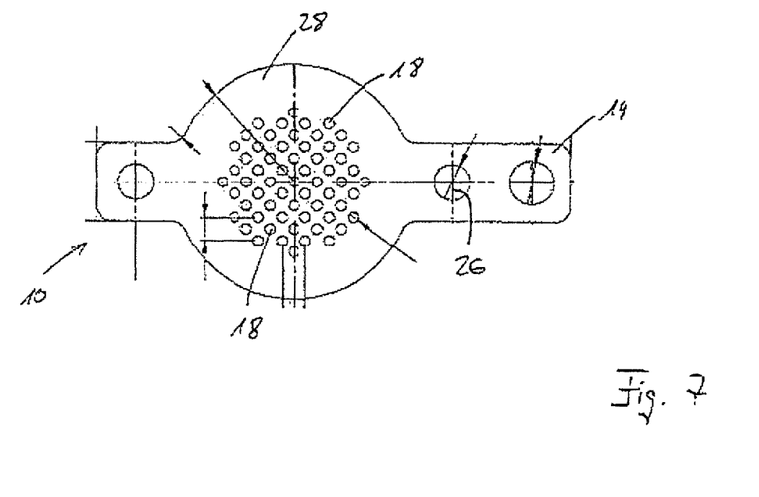

FIG. 7 shows an electrode 10 having a multitude of holes 18 arranged in a regular pattern, in the present case a square pattern. The distance between two holes that are spaced apart from one another across the diagonal of one of the squares, and so are arranged directly below one another or alongside one another in the diagram shown in FIG. 7, is greater than the diameter of each of the holes 18.

It will be appreciated that this electrode too has a contact connection site 14 and securing holes 26.

Figure 8:
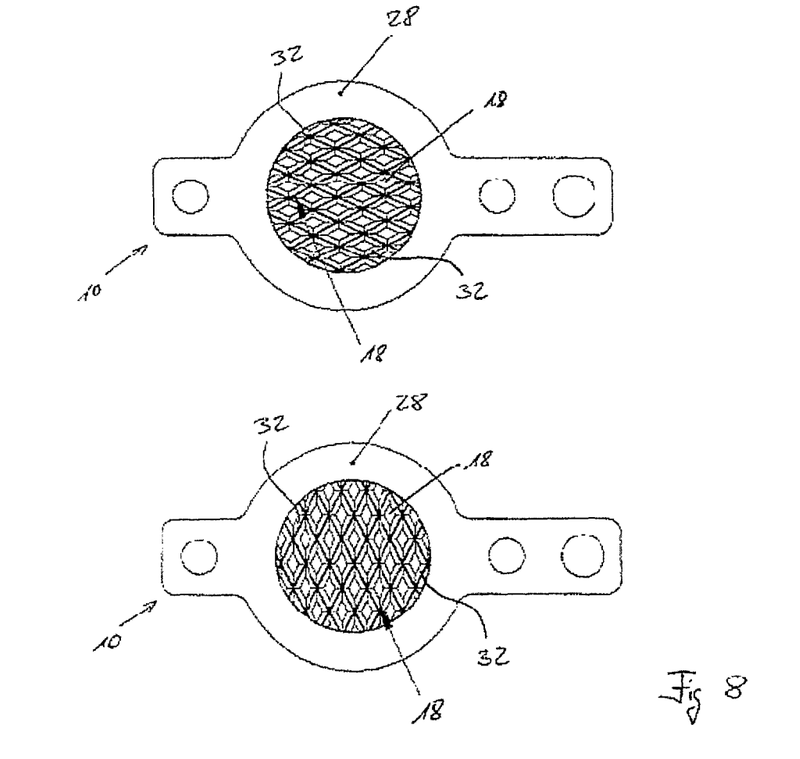
Figure 9:
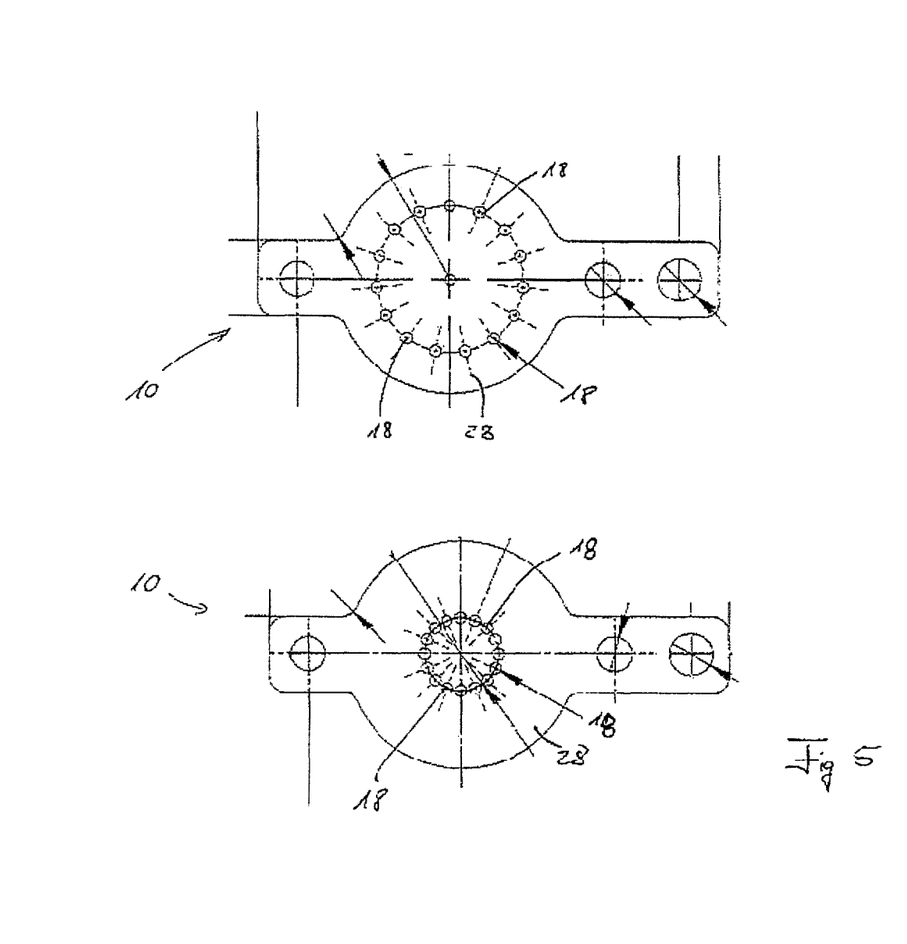

FIG. 8 shows two further embodiments of the electrode 10, in which the main region 28 has a multitude of diamond-shaped holes 18. It can be seen that, in the two electrodes shown in FIG. 8, the position of the diamonds is rotated by 90°. The edges of these holes 18 have a chamfer 32, i.e. are tapered. These chamfers 32 can be produced in a particularly simple and exact manner by etching processes, especially in the case of a base structure composed of silicon.

LIST OF REFERENCE NUMERALS 1 apparatus
2 base flange
4 top flange
6 flow orifice
8 electrode assembly
10 electrode
12 gasket
14 contact connection site 16 gasket ring
18 hole
20 threaded bar
22 screw nut
24 washer
26 securing hole
28 main region
30 elongated hole
32 chamfer

The invention claimed is:

1. An apparatus for electrochemical treatment of wastewater, comprising:
   at least one electrolysis cell through which the wastewater to be treated is guided;
   a multitude of electrode assemblies comprising electrodes in the at least one electrolysis cell, wherein the electrodes in the multitude of electrode assemblies are arranged such that the wastewater to be treated is guided through holes in the electrodes;
   at least one perforated plate arranged upstream of the multitude of electrode assemblies and oriented in a flow direction of the wastewater to be treated such that the wastewater to be treated is guided through the at least one perforated plate prior to the multitude of electrode assemblies; and
   at least one of the electrode assemblies of the multitude of electrode assemblies has three electrodes each having a plurality of holes arranged such that they are offset from one another and do not line up with the plurality of holes in an adjacent electrode, and the wastewater to be treated is guided through the plurality of holes in all three electrodes, wherein at least some edges of some of the plurality of holes are chamfered, wherein wastewater flow is at least partially dependent upon one or more of a chamfer angle and a size of a hole of the plurality of holes.

2. The apparatus according to claim 1 wherein each of the multitude of electrode assemblies have at least three electrodes through which the wastewater to be treated is guided.

3. The apparatus according to claim 1 a distance between each of the holes in the plurality of holes is at least as great as a diameter of each of the holes.

4. The apparatus according to claim 1 wherein all of the edges of all of the holes are chamfered.

5. The apparatus according to claim 1 wherein a first portion of at least some of the electrode assemblies has two anodes and one cathode and a second portion of the at least some of the electrode assemblies has one anode and two cathodes, and wherein adjacent electrode assemblies belong to different portions of the electrode assemblies.

6. The apparatus according to claim 1 wherein each of the electrode assemblies comprise one anode between two cathodes.

7. The apparatus according to claim 1 further comprising an electrical control system set up to supply anodes and/or cathodes of one or more of the multitude of electrode assemblies with different electrical current densities.

8. The apparatus of claim 7 wherein the electrical control system supplies one or more anodes or one or more cathodes of one of the multitude of electrode assemblies with the different electrical current densities.

9. The apparatus according to claim 1 wherein the electrodes in at least some of the multitude of electrode assemblies have different hole patterns, and wherein there is an increase in a size of the holes in the flow direction of the wastewater to be treated.

10. The apparatus according to claim 1 at least some of the electrodes have a diamond-coated base structure composed of a passivating metal.

11. The apparatus according to claim 10 wherein all of the electrodes have the diamond-coated base structure composed of the passivating metal.

12. The apparatus according to claim 1 wherein each of the plurality of holes are diamond shaped.

13. The apparatus according to claim 12 wherein the diamond shaped holes in two of the electrodes are rotated by 90 degrees.

* * * * *